UNITED STATES PATENT OFFICE.

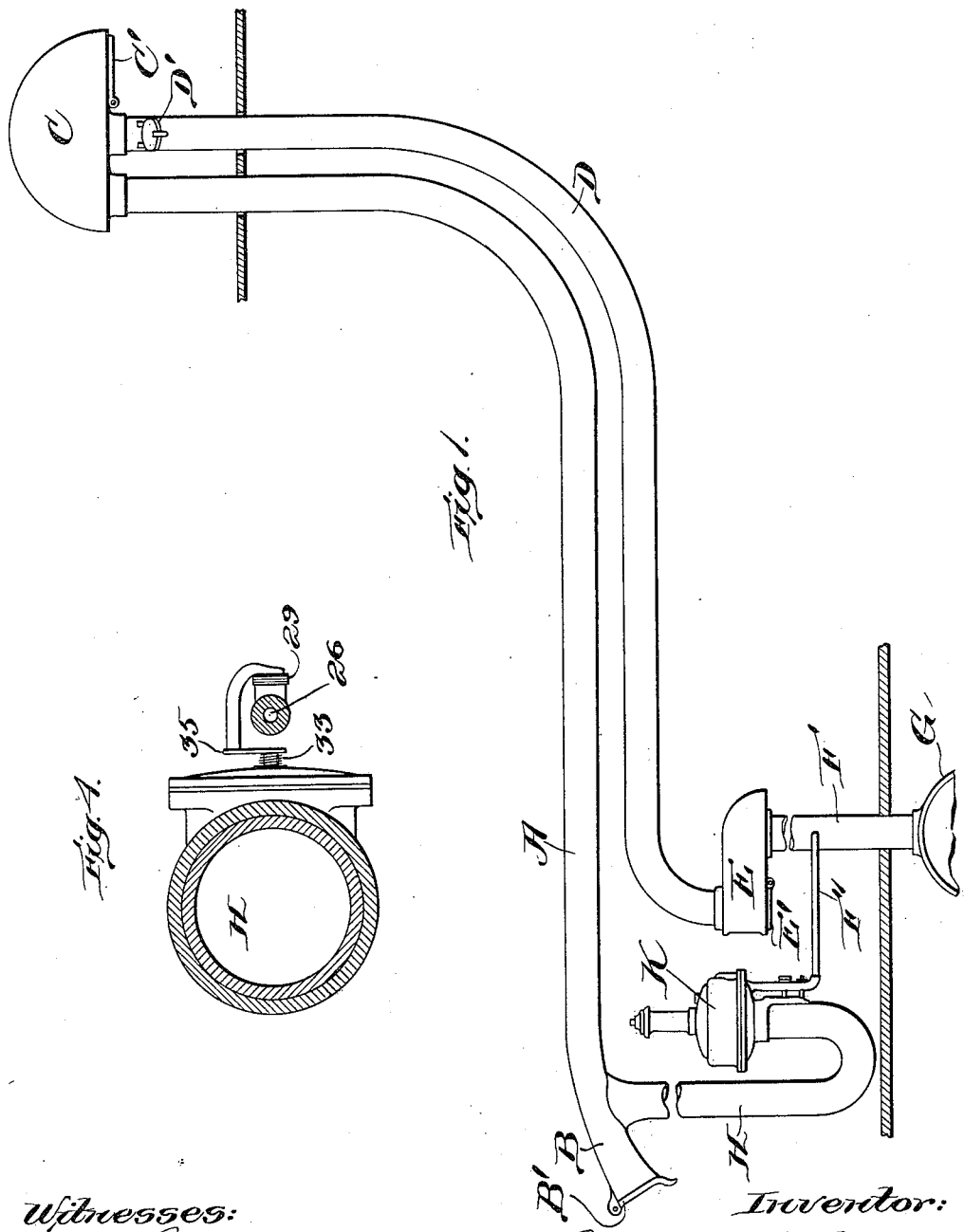

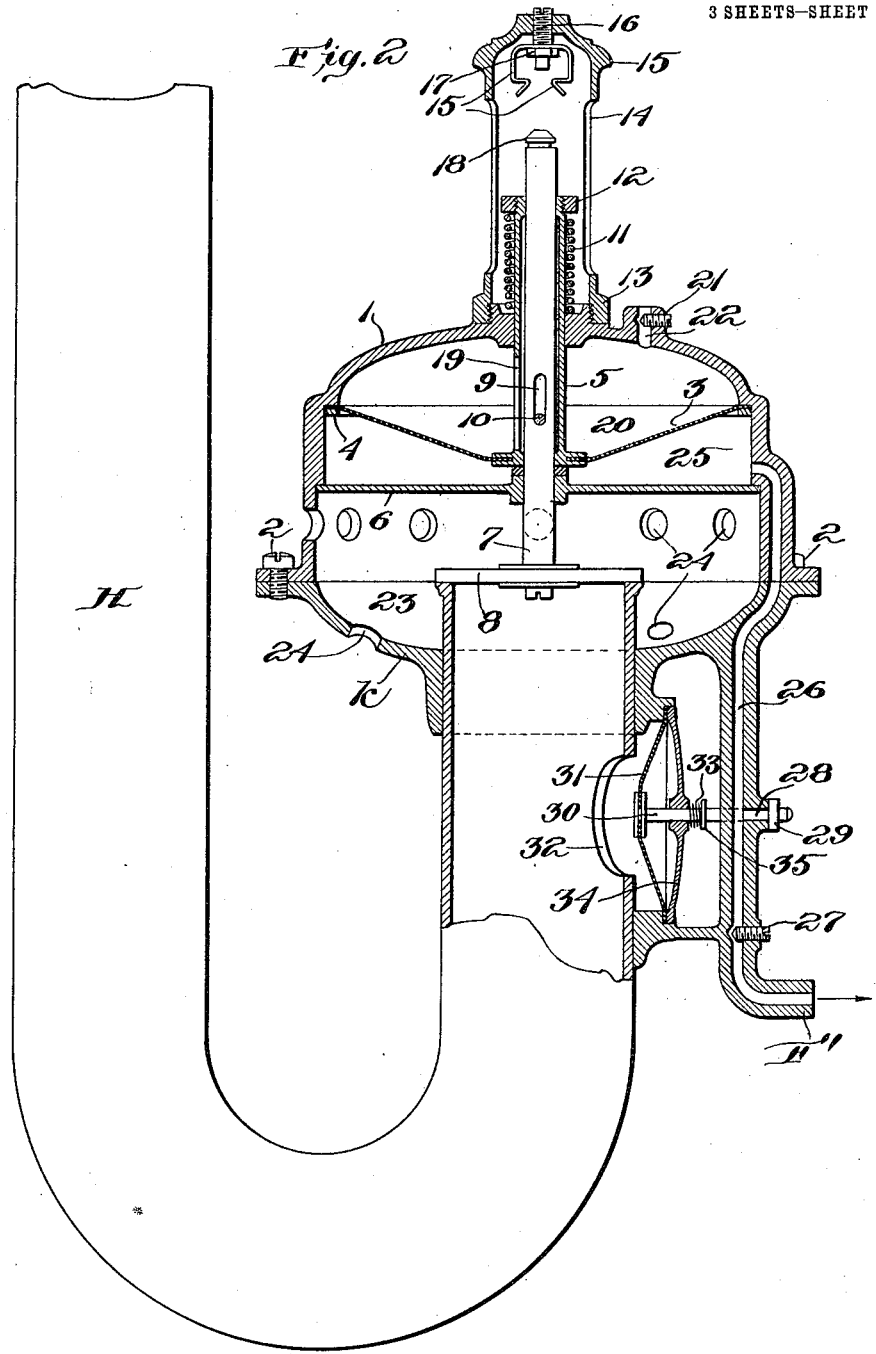

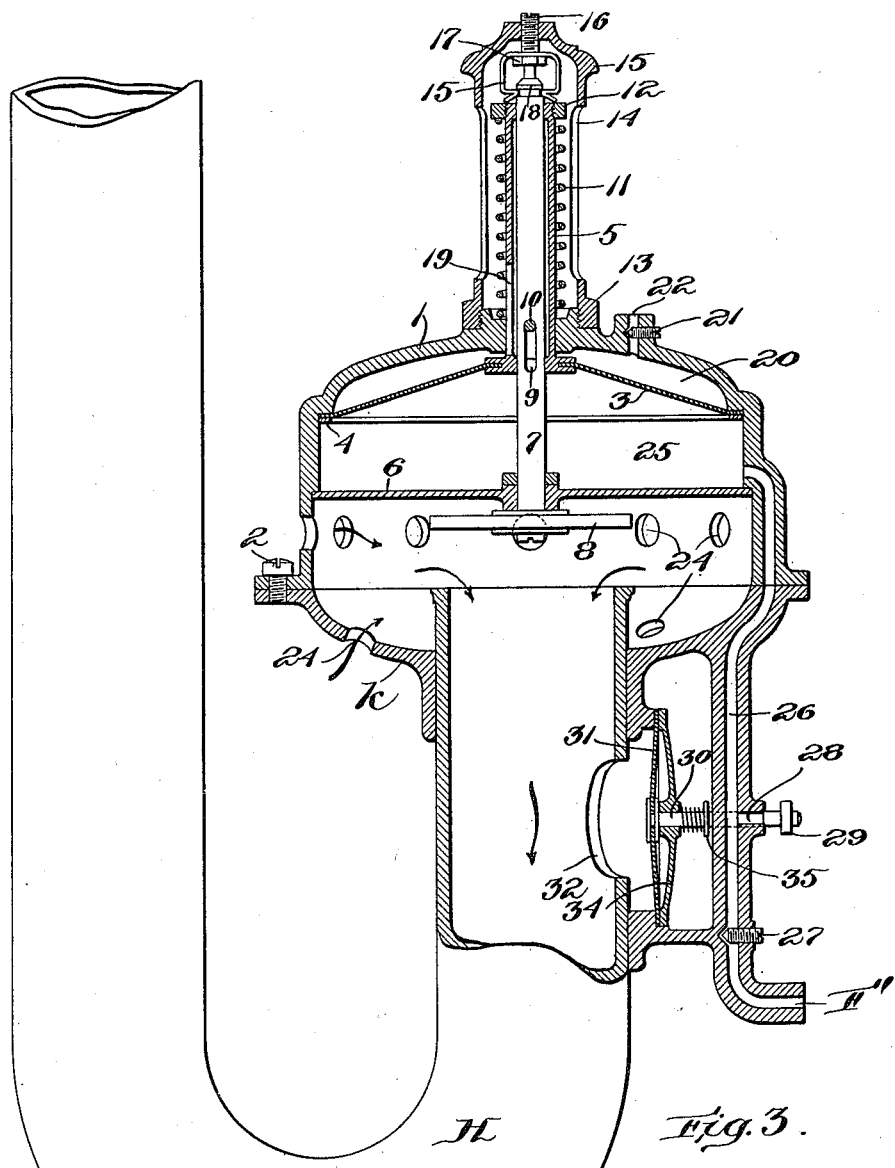

EDMOND A. FORDYCE, OF BOSTON, MASSACHUSETTS, ASSIGNOR, BY MESNE ASSIGNMENTS, TO AMERICAN PNEUMATIC SERVICE COMPANY, OF BOSTON, MASSACHUSETTS, A CORPORATION OF DELAWARE.

PNEUMATIC-DESPATCH-TUBE APPARATUS.

1,013,148. Specification of Letters Patent. Patented Jan. 2, 1912.

Application filed January 21, 1907. Serial No. 353,235.

*To all whom it may concern:*

Be it known that I, EDMOND A. FORDYCE, of Boston, in the county of Suffolk and State of Massachusetts, have invented certain new and useful Improvements in Pneumatic-Despatch-Tube Apparatus, of which the following is a specification.

The invention relates to pneumatic despatch tube systems, and more particularly to that class of system in which a vacuum is maintained in the transmission tubing, and the carriers are driven through the tube by the admission of air to the tubing back of the carrier. In this type of apparatus it is customary to provide a valve through which air is admitted to the transmission tube and to operate and control this valve in such manner that a reduction of pressure in the transmission tube will cause the valve to open and to remain open for a sufficient length of time for the transmission of a carrier from one station to another. Whenever a carrier is to be despatched, the sending terminal in the transmission tubing is opened and the carrier inserted, and the opening of the terminal causes a reduction of pressure in the transmission tubing, and consequently an opening of the air valve, so that air is admitted to drive the carrier through the tubing. An accidental opening of a terminal for an instant, or the momentary opening of the discharge terminal as the carrier leaves the transmission tube, will also reduce the pressure in the system, and cause an opening movement of the valve, so that air may be admitted to the transmission tubing when no carrier is to be despatched, or after the carrier has been discharged, with a resulting increase in the power required to operate the apparatus.

One feature of the invention contemplates the provision of a valve operating mechanism which will be given a valve opening movement whenever there is a fluctuation in movement of the pressure in the transmission tube such as is produced upon the despatching of a carrier, but will not be given a valve opening movement by a fluctuation of pressure in the transmission tube such as might occur from an accidental momentary opening of the terminal, or which occurs upon the opening and closing of the tube to the atmosphere when a carrier is discharged. The fluctuation in the pressure in the tubing which occurs on the accidental opening of a terminal, or upon the discharge of a carrier, is of but momentary duration, while the fluctuation which occurs upon the despatching of a carrier continues for a material length of time, and the valve opening mechanism is accordingly so constructed that a predetermined fluctuation of the pressure which is greater in duration than that produced by a momentary opening of the tube to the atmosphere is required to effect the opening of the valve. The timing mechanism which determines the period during which air is admitted to the transmission tubing when the air valve is opened is in this type of apparatus commonly so constructed that the valve is allowed to gradually close after it has been opened, the retarding action of the timing mechanism being adjusted to secure the proper interval between the opening and complete closing of the air valve. The supply of air to the transmission tubing is therefore gradually throttled so that it is not uniform during the transmission of the carrier, and so that the complete closing of the valve must be delayed for some time after the discharge of the carrier, in order that the proper transmission and discharge of the carrier may be insured. The gradual closing of the valve also results in objectionable noise caused by the rapid flow of air through the restricted entrance to the tubing when the valve is nearly closed.

A further feature of the invention contemplates the provision of a valve operating mechanism which operates to open the valve upon the despatching of a carrier, retains it in substantially fixed position a sufficient length of time for the transmission of the carrier, and then quickly closes it, thus providing a substantially uniform supply of air during the transmission of the carrier, and an immediate shutting off of the supply at the end of the transmission interval. This insures the proper and uniform transmission of the carriers, enables the transmission interval to be accurately timed with a resulting decrease in the waste of air and consumption of power, and avoids the disagreeable noises incident to a gradual closing of the valve. In accordance with this feature of the invention, the valve opening mechanism operates upon a fluctuation of pressure in the transmission tubing produced by the despatching of a carrier to open the air valve and the valve is retained in position during an interval determined by the operation of a timing mechanism which acts at the close of the interval to cause an immediate movement of the valve from full open to closed position.

The specific construction and arrangement of the parts of the mechanisms in which the above features are embodied is immaterial to the invention in its broader aspects, and may be changed and modified as found desirable or best suited to the conditions under which the apparatus in which the invention is embodied is to be used.

In addition to the broader features above referred to, the invention includes certain features of construction and arrangement which will be referred to in the claims, and which, while they are not essential to the invention in its broader aspects, are of advantage in contributing to the efficiency and simplicity of an apparatus embodying the broader features.

The invention will be readily understood from the accompanying drawings, in which—

Figure 1 is a diagrammatic view of a pneumatic despatch tube system showing the device in operating connection therewith; Fig. 2 is an enlarged sectional view of the device showing parts in normal or closed position; Fig. 3 is a similar view to Fig. 2 showing the parts in operative or open position; and Fig. 4 is an enlarged detail view to be hereinafter described.

Like letters of reference refer to like parts throughout the several views.

A is a tube for the transmission of carriers connecting the bell mouth B controlled by the usual inlet valve B' at the central station with the discharge terminal C at the sub station controlled by the usual discharge valve C'.

D is a transmission tube for the return of the carriers from the despatching inlet B' at the sub station to the receiving terminal E controlled by the discharge valve E' at the central station. The terminal E at the central station is connected with a suction drum G by the tube F. The bell mouth B at the central station communicates with the air supply tube H controlled by the valve controlling and timing attachment K, which attachment is connected with the vacuum tube F by a small tube F'. The valve controlling and timing attachment K consists of the lower casting k attached to and surrounding the mouth of the air supply tube H. The upper casting 1 is secured to the casting k by screws 2. Mounted within the upper casting 1 is a diaphragm piston 3 secured therein by a ring 4 which diaphragm is centrally connected with a sleeve 5 adapted to slide in the upper portion of said casting 1. A plate 6 is also mounted in said casting 1 and forms an inclosed chamber 25 between said plate and the diaphragm piston 3. Centrally mounted in a bearing in said plate 6 and adapted to reciprocate therein is a valve stem 7 having secured to the lower end thereof the valve 8 adapted to close the open end of the air supply tube H. The valve stem 7 is also slidably mounted within the sleeve 5, said valve stem 7 having a slot 9 allowing a limited movement therein of the pin 10 secured to said sleeve 5. Mounted over the upper end of the sleeve 5 and resting against the top outer side of the upper casting 1 is a spiral spring 11 confined by the adjustable nut 12 on the top of the sleeve 5 and which spring is adapted to throw said valve stem 7 upward. Threaded to the upper part of the casting 1 is a supporting member 13 open to the atmosphere through apertures 14. In the upper part of the member 13 is an adjustable threaded shoulder screw 16 which has the spring latches 15 secured thereto by a nut 17. These latches are adapted to engage the collar 18 on the upper part of the valve stem when said valve stem is in its raised position. This adjustable shoulder screw 16 is also adapted to limit the upward movement of the stem 7. A slot 19 in the sleeve 5 is adapted, in the raised position of said sleeve, to permit the free communication of the closed chamber 20 with the atmosphere. When the slot 19 is not in communication with the atmosphere, the movement of the air in the inclosed chamber 20 is controlled by the timing screw 21 graduating the port 22. The chamber 23 surrounding the valve 28 communicates with the atmosphere through apertures 24 and is adapted when valve 8 is raised to admit air to the supply tube H. The inclosed chamber 25 is connected with the vacuum tube F by the tube F' and the exhaust of air therethrough from the chamber 25 is controlled by the timing screw 27. In this construction the chamber 25 and the tube F form a means normally actuating the piston in a direction to close the valve. An opening 28 adapted to connect the passage 26 with the atmosphere is controlled by a valve 29 mounted on a valve stem 30 attached to a small diaphragm 31 in communication with the air supply tube H through the aperture 22. The diaphragm 31 is normally held in the position shown in Fig. 2 by the vacuum in the tube H. A spring 33 mounted between the diaphragm supporting ring 34 and the arm 35 on the stem 30 is adapted to lift the valve 29 and uncover the port 28 when the diaphragm 31 is released by the vacuum fluctuating in the tube H.

The operation is as follows: In sending a carrier from the central station to the sub station, the inlet valve B' is opened and a carrier inserted in the bell mouth B. The vacuum maintained in the system is partially destroyed by the opening of the inlet B' releasing the diaphragm 31 which is thrown by spring 33 from the position shown in Fig. 2 to that shown in Fig. 3, lifting the valve 29, uncovering the port 28 and breaking the vacuum in the chamber 25 which normally holds the diaphragm piston 3 and valve 8 in the position shown in Fig. 2. This breaking of the vacuum in the chamber 25 permits the diaphragm 3 to be raised by action of the spring 11. The upward movement of the diaphragm piston 3 is resisted by the air in the chamber 20 which at this time can escape only through the restricted outlet 22. The upward movement of the diaphragm is therefore comparatively slow, and this movement does not affect the valve 8, since the pin 10 moves idly in the slot 9. In sending the carrier, however, the terminal through which the carrier is inserted remains open for a sufficient length of time for the diaphragm 3 to move upward against the resistance offered by the escape of air through the restricted opening 22 until the pin 10 engages the upper end of the slot 9, and to then continue its upward movement so that the valve 8 is lifted to open the tube H to the atmosphere. As the pin 10 engages the upper end of the slot 9, the slot 19 in the sleeve 5 rises to a position where it opens communication between the chamber 20 and the atmosphere, so that the air in the chamber 20 may freely escape from the chamber and that part of the upward movement of the diaphragm 3 and sleeve 5 which opens the valve takes place quickly. The valve is therefore quickly opened whenever the fluctuation in the pressure in the transmission tube continues for a sufficient length of time for the diaphragm piston 3 to move upward until the pin 10 engages the upper end of the slot 9 and brings the slot 19 into communication with the atmosphere. When the valve 8 is raised to the position indicated in Fig. 3 upon the despatching of the carrier, the collar 18 at the upper end of the valve stem 7 is engaged by the spring latches 15 so that the valve is retained in its full open position. After inserting the carrier in the transmission tubing, the operator releases the inlet valve B', which immediately closes, and the carrier starts toward the discharge terminal C'. The closing of the valve B' and the travel of the carrier produces a partial vacuum in the transit and supply tubes, which may be regulated by adjusting the screw 16 to vary the opening between the valve 8 and the mouth of the air supply tube when the valve is in full open position. This reduction in the pressure in the supply tube H is sufficient to draw the diaphragm 31 inward against the tension of the spring 33, thereby closing the port 28. The pressure within the chamber 25 now gradually falls as the air within the chamber escapes past the timing screw 27 to the exhaust drum. The diaphragm piston 3 therefore gradually moves downward. The downward movement of the diaphragm does not affect the valve 8 until the pin 10 engages the lower end of the slot 9, when the further movement of the diaphragm draws the collar 18 out of engagement with the latches 15. When this occurs, the valve 8 immediately closes, the slot 9 allowing the valve to move downward relatively to the diaphragm 3 and sleeve 5. The time during which the valve 8 is open will therefore depend upon the time required for the diaphragm 3 and sleeve 5 to move downward until the pin 10 engages the lower end of the slot 9 and withdraws the collar 18 from engagement with the latches 15, during which time the valve is retained in full open position. The timing mechanism does not affect the valve until the end of the transmission interval, and then causes an immediate closing of the valve.

After the valve has closed the diaphragm 3 continues to move downward idly until it comes into the position indicated in Fig. 2. When in this position its upward movement is restricted by the restricted opening 22 from the chamber 20, and a slight upward movement will not effect an opening of the valve. A momentary breaking in the vacuum in the transmission tube, such as might accidentally occur, or such as occurs upon the opening of the delivery valve in discharging a carrier, is not of sufficient duration to cause such an upward movement of the diaphragm piston 3 as will bring the pin 10 against the upper end of the slot 9 and open the valve 8 and cause an admission of air to the supply tube H or a repetition of the air admission. The pin 10 and the slot 9 provide means whereby a limited movement of the valve opening mechanism is permitted without opening the valve 8.

A carrier may be despatched from a substation by opening the valve D' and inserting a carrier in the tube B. The opening of the valve is of longer duration than the momentary opening of the delivery valve, and causes a fluctuation of pressure in the transmission tube of sufficient duration to cause an opening of the valve 8 in the manner above described.

Having explained the nature and object of the invention, and specifically described one form of apparatus in which it may be embodied, what I claim is:—

A pneumatic despatch tube apparatus, having, in combination, a transit tube through which carriers are transmitted and normally closed, a sending station into which carriers are inserted for transmission, means for exhausting air from said tube, an air inlet adapted to admit air to said tube for driving carriers, a valve normally closing said air inlet, a piston adapted to open said valve upon a fluctuation of the pressure within said tube, means normally actuating the return movement of said piston for closing said valve, means for permitting a limited movement of the valve opening mechanism without opening said valve, and means for retaining said valve in open position during said non-operating return movement of said piston, substantially as described.

In testimony whereof, I have signed my name to this specification in the presence of two subscribing witnesses, this seventh day of January A. D. 1907.

EDMOND A. FORDYCE.

Witnesses:
MARY G. SMITH,
C. C. JENNINGS.

Copies of this patent may be obtained for five cents each, by addressing the "Commissioner of Patents, Washington, D. C."